Patented Feb. 21, 1950

2,498,514

UNITED STATES PATENT OFFICE 2,498,514

ZIRCONIUM COMPOUND DEODORANT AND ANTIPERSPIRANT

Henry L. Van Mater, Highland Park, N. J., assignor, by mesne assignments, to National Lead Company, New York, N. Y., a corporation of New Jersey No Drawing. Application January 18, 1946, Serial No. 642,107

7 Claims. (Cl. 167—90)

1

The present invention relates to compounds of zirconium which are of particular value as deodorants and anti-perspirants. It is an object of the invention to prepare chemically neutral or non-acid compounds of zirconium which are not irritating to the human skin and which possess properties making them suitable as deodorants and anti-perspirants.

Most compounds of zirconium, if soluble in water, are relatively highly acid and cannot be used in contact with the skin. Furthermore, attempts to prepare zirconium salts of aliphatic acids result in the production of relatively water insoluble materials.

However, in accordance with the present invention, zirconium salts of hydroxy aliphatic acids can be prepared, which salts possess the property of absorbing perspiration odors and which are neutral or non-acid in chemical reaction and which are non-irritating to the skin. Such salts may be used as anti-perspirants in simple water solutions or may be compounded with usual cosmetic bases, such as mineral oil, hydroxy stearic acid, hydrogenated castor oil, petrolatum, acacia and other cosmetic vehicles such as spermaceti and karaya gum where they function as the active or essential ingredient.

The anti-perspirant deodorant compounds of the present invention can be prepared by combining any water soluble salt of zirconium, such as hydrated zirconium oxychloride, with an organic acid such as the hydroxy aliphatic acids, the mole ratios of the reactants being present in ranges that are somewhat critical in order to obtain complete reaction with the precipitation of a water insoluble zirconium compound which can subsequently be made water soluble by neutralization with an alkali.

As an example purely illustrative of the invention, when alpha hydroxy propionic acid $CH_3CH(OH)COOH$ is mixed with zirconium oxychloride in water solution, an insoluble precipitate of a zirconium compound of alpha hydroxy propionic forms when the mole ratio is 3 moles of acid to 1 mole of zirconium salt. A decrease in the mole ratio below 3 moles of the acid to 1 mole of the zirconium salt causes incomplete precipitation; addition of more than 3 moles of the acid to 1 mole of the zirconium salt does not produce additional precipitation. This action of hydroxy propionic acid is in contrast to the action of propionic acid alone which does not produce a precipitate with soluble zirconium salts irrespective of the ratios in which the reactants may be mixed.

2

When the precipitated zirconium compound of lactic acid, as produced above, is collected and washed, a suspension of it in water shows that the product is still acid in reaction since the supernatant liquid possesses a pH of between about 5–6. In accordance with the present invention, the precipitated zirconium salt of the hydroxy acid may be rendered water soluble by the addition of an alkali. The alkali should be added to the zirconium salt, the latter being preferably in suspension in water, in small increments and in sufficient amounts to produce a pH of about 7. During the addition of the alkali, the zirconium salt of the hydroxy acid is gradually dissolved and complete solution is obtained at about the neutral point. The solution, now non-acid or slightly alkaline, may be evaporated to produce a water soluble zirconium salt of the hydroxy organic acid with the particular base of the alkali employed. Where the alkali is added in quantities in excess of that required to produce a pH of about 7 and to re-dissolve the precipitated zirconium compound of the hydroxy organic acid, such excess alkali tends to destroy the soluble zirconium compound and re-precipitate the material, or to destroy it with the formation of an insoluble hydrated zirconium compound, generally zirconium hydroxide.

The alkalies found suitable for neutralization and resolution of the water insoluble zirconium compounds with the hydroxy acids are the hydroxides of the alkali metals and alkaline earth metals or materials producing such hydroxides in water solution, ammonia and substituted amines. In general, sodium hydroxide will be the alkali employed for this purpose although an alkaline earth metal hydroxide, such as calcium hydroxide, may be employed with equal facility.

In lieu of the caustic alkalies or the hydroxides of the alkaline earth metals, such as calcium hydroxide, milder alkalies may be employed to effect the formation of the soluble neutral zirconium salt with re-solution of the precipitated salt of zirconium and the hydroxy organic acid. Thus, ammonium hydroxide may be added to a suspension of a zirconium salt of a hydroxy organic acid in amounts sufficient to neutralize the suspension and induce re-solution of such precipitated salt. In such instances, excess of ammonium hydroxide is not deleterious since no precipitation of zirconium hydroxide occurs upon addition of excess ammonia. As in those instances where caustic alkali is used as the neutralizing agent, the solution neutralized with ammonia may be evaporated to dryness with the production of a crystalline salt soluble in water.

Also, in accordance with the invention, certain amines, substituted amines and quaternary bases act in a manner similar to ammonia. These amino and amino hydroxy compounds, like ammonia, may be added to an aqueous suspension of the insoluble salt of zirconium and the hydroxy organic acid to neutralize the suspension and obtain re-solution of the insoluble zirconium salt. Upon evaporation of the neutralized solution, soluble crystalline salts are not obtained as the end product as is the case when employing caustic alkalies or ammonia as the neutralizing agent. The end product is rather thickly viscous to solid. This end product is, however, like the crystalline salts mentioned hereinbefore, soluble in water. Amino compounds or amino hydroxy compounds, all classed herein as quaternary bases, suitable for the preparation of neutral water soluble zirconium salts of hydroxy aliphatic acids are as follows:

Triethanolamine $N(CH_2CH_2OH)_3$
2-amino-1-butanol $(CH_3CH_2CHNH_2-CH_2OH)$
2-amino-2methyl-1-propanol
$(CH_3-CCH_3NH_2-CH_2OH)$
2-amino-2-methyl-1, 3-propanediol
$CH_2OH-CCH_3NH_2-CH_2OH)$
2-amino-2-ethyl-1, 3-propanediol
$(CH_2OH-CC_2H_5NH_2-CH_2OH)$
Tris (hydroxy methyl) amino methane
$((CH_2OH)_3CNH_2)$
Urea $(CO(NH_2)_2)$ The water soluble zirconium salts of the hydroxy aliphatic organic acids may be employed as anti-perspirants by applying a suitable solution thereof in water to the desired portion of the body, say under the arm pits. Such solution may contain a concentration of 10% or more of the soluble zirconium salt although, generally, the concentrate will be less. Or, a solution of the salt in water may be compounded with a desired amount of volatile carrier liquid such as alcohol. Or, the salt may be mixed with a suitable carrier base, the latter being the preferred method of application. Due to the amount of water that may be incorporated in hydrogenated castor oils, this latter material is a suitable vehicle or base in which to distribute the antiperspirant. An anti-perspirant cream may be prepared as follows:

| | |
|---|---|
| Neutralized zirconium lactate_____grams__ | 4 |
| Glycerine _____ccs__ | 12 |
| Hard hydrogenated castor oil_____grams__ | 10 |
| Soft hydrogenated castor oil_____do____ | 70 |

Where it is desired that the base possess the properties of a liquid cream, hydroxy stearic acid or light mineral oil may be suitably compounded in the presence of the usual emulsifying agents, such as soap, sodium borate or the usual gums such as acacia or other protective colloids. Where it is desired that the product have a heavy body, waxes such as spermaceti or karaya gum may be incorporated with mineral oil and hydrogenated castor oil, petrolatum and other cosmetic bases or vehicles.

In addition to the zirconium salt of lactic acid described above, other organic acids may be employed to react with a soluble zirconium salt to produce a water insoluble zirconium compound which, upon neutralization with an alkali, will produce a water soluble material possessing similar deodorant and anti-perspirant properties. Thus, organic acids containing more than one carboxyl group will serve the same purpose, particularly those acids containing a hydroxyl group and a carboxyl attached to the same carbon atom or a hydroxyl group attached to a carbon atom in the position alpha to the carboxyl group. A water soluble zirconium salt will combine with malic acid to form a water insoluble zirconium compound providing the mole relation between the zirconium salt and malic acid is 1:1. Where the mole ratio is either greater or less than this amount, incomplete precipitation of the zirconium compound with malic acid results. The zirconium compound thus formed may be neutralized with any of the bases mentioned hereinabove with the production of a water soluble compound which can be recovered upon evaporation.

It is likewise possible to prepare deodorant zirconium compounds of polyhydroxy acids. Thus, when a solution containing, for instance, 0.10 mole of hydrated zirconium oxychloride is mixed with 0.10 mole of tartaric acid, a precipitate of a zirconium compound of tartaric acid forms within a few moments. If the ratio of zirconium salt to tartaric acid is greater than mole for mole, the precipitation is incomplete and, if the ratio is 2 moles of zirconium salt to 1 mole tartaric acid, no precipitation results.

The precipitated zirconium compound of tartaric acid may likewise be neutralized with a base and caused to re-dissolve to produce a water soluble compound which may be isolated by evaporation.

The same type of reaction results when combining a soluble zirconium salt with citric acid. In this case, optimum precipitation of the zirconium compound results when employing a ratio of 2 moles of the acid to 3 moles of the zirconium salt. As is the case with the other zirconium compounds described as a part of this invention, the citrate is also soluble in bases upon adding sufficient base to neutralize the salt.

From the foregoing, it will be seen that the invention provides non-acid compounds of zirconium, that is, either neutral or slightly alkaline materials, all of which are water soluble and all of which are non-irritating to the human skin, that can be employed as deodorants. These products are non-acidic salts of organic acids and particularly of the hydroxy acids. These compounds may be used as such as deodorants or in water solution, or in solutions in a readily evaporable liquid, or may be carried in paste, cream, oily, fatty or waxy vehicles of the cosmetic type.

What is claimed is:

1. A deodorant and anti-perspirant composition comprising a dispersing medium of an emulsified oil and containing dispersed therein as the active ingredient the reaction product of an acidic water soluble salt of zirconium and an hydroxy aliphatic acid and sufficient water soluble alkali to render said product non-acid and water soluble.

2. A deodorant and anti-perspirant composition comprising a dispersing medium of an emulsified oil and containing dispersed therein as the active ingredient the reaction product of an acidic water soluble salt of zirconium and citric acid and sufficient water soluble alkali to render said product non-acid and water soluble.

3. A deodorant and anti-perspirant composition comprising a dispersing medium of an emulsified oil and containing dispersed therein as the active ingredient the reaction product of an acidic water soluble salt of zirconium and an hydroxy aliphatic acid and sufficient caustic alkali to render said product non-acid and water soluble.

4. A deodorant and anti-perspirant composition comprising a dispersing medium of an emulsified oil and containing dispersed therein as the active ingredient the reaction product of an acidic water soluble salt of zirconium and an hydroxy aliphatic acid and sufficient substituted ammonia base to render said product non-acid and water soluble.

5. A deodorant and anti-perspirant composition comprising a dispersing medium of an emulsified oil and containing dispersed therein as the active ingredient the reaction product of an acidic water soluble salt of zirconium, an hydroxy aliphatic acid and sufficient calcium hydroxide to render said product non-acid and water soluble.

6. A deodorant and anti-perspirant composition comprising a dispersing medium of an emulsified oil and containing dispersed therein as the active ingredient the reaction product of an acidic water soluble salt of zirconium and citric acid and sufficient water soluble alkali to render said product non-acid and water soluble.

7. A deodorant and anti-perspirant composition comprising a dispersing medium of an emulsified oil and containing dispersed therein as the active ingredient the reaction product of an acidic water soluble salt of zirconium and tartaric acid and sufficient water soluble alkali to render said product non-acid and water soluble.

HENRY L. VAN MATER.

REFERENCES CITED

The following references are of record in the file of this patent:

UNITED STATES PATENTS

| Number | Name | Date |
| --- | --- | --- |
| 558,197 | Muller-Jacobs | Apr. 14, 1896 |
| 1,905,848 | Gelarie | Apr. 25, 1933 |
| 2,013,856 | Kinzie | Sept. 10, 1935 |
| 2,236,387 | Wallace | Mar. 25, 1941 |
| 2,316,141 | Wainer | Apr. 6, 1943 |

FOREIGN PATENTS

| Number | Country | Date |
| --- | --- | --- |
| 237,624 | Germany | Aug. 23, 1911 |

OTHER REFERENCES

Mandl: Zeitschrift für Anorganische Chemie, Band 37, pages 278, 279, 282, 283, 284, 287, 288 and 289 (1903.) Copy in Scientific Library.

Berichte der Deutsche Chemische Gesellschaft vol. 40 (1907), page 808. Copy in Scientific Library.